3,347,922
TETRAKIS-(DIFLUOROAMINO) BUTANE
Richard P. Rhodes, Newark, and Donald A. Guthrie, Cranford, N.J., assignors to Esso Research and Engineering Company, a corporation of Delaware
No drawing. Filed Dec. 1, 1959, Ser. No. 856,614
1 Claim. (Cl. 260—583)

The present invention relates to a novel compound, 1,2,3,4 tetrakis-(difluoroamino) butane.

Strong oxidizers are quite valuable in the chemical field, especially for use in combination with chemical fuels. Considerable work has been done to make better oxidizing agents for fuels, such as boron. Calculations indicate that compounds having high $NF_2/C$ ratios will have excellent oxidizing properties. However, while a number of attempts have been made to prepare various compounds of this type, they have often been unsuccessful.

An object of this invention is to provide a new oxidizer which is suitable for use in rocket propellant systems.

It has now been discovered that 1,2,3,4 tetrakis-(difluoroamino) butane is a good oxidant for chemical fuels containing boron or hydrogen. This tetrakis compound, which has a $NF_2/C$ ratio of 1:1 and an empirical formula $C_4H_6N_4F_8$, has the following chemical structure:

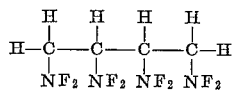

It is a colorless liquid which boils at about 175° C. and has a density of about 1.6 grams per cc.

This new compound may be prepared in several ways. For instance, it can be made from 1,3-butadiene, a conjugated diolefin, and tetrafluorohydrazine, or it can be prepared from a bis-(difluoroamino) butene, e.g., a mixture of the 1,2 and 1,4 adducts of butadiene, and tetrafluorohydrazine. The conditions are substantially the same for the two reactions except for the quantity of $N_2F_4$ required.

A convenient method for preparing 1,2,3,4 tetrakis-(difluoroamino) butane from 1,3-butadiene is as follows: Tetrafluorohydrazine (1.5 mole) and 1 mole of 1,3-butadiene are introduced in the gas phase into a flow reactor comprising a 15-foot length of ¼″ stainless steel tubing maintained at 200° C. The two gases are contacted at that temperature under a pressure of one atmosphere for 2 minutes. The liquid products formed are collected in an ice trap at 0° C. and the unreacted gases are vented. The liquid product comprises a mixture of 1,2- and 1,4- (cis and trans) bis-(difluoroamino) butene, i.e., 1,2-bis-(difluoroamino) 3-butene and 1,4 bis-(difluoroamino) 2-butene. No tetrakis difluoroaminobutane is obtained.

The mixed bis adducts are then placed in a bomb reactor, frozen in liquid $N_2$, evacuated, and a 10-mole excess of $N_2F_4$ is condensed into the evacuated bomb at −196° C. The reactor is sealed and then heated at 101° C. for 6 hours. The resulting $N_2F_4$ pressure during the reaction is 400 p.s.i. After 6 hours the excess $N_2F_4$ is vented and the liquid product recovered contains 62 wt. percent 1,2,3,4 tetrakis-(difluoroamino) butane. The remainder is mainly a mixture of unreacted bis adducts. The 1,2-bis adduct is easily removed from the mixture by vacuum distillation at 10 mm. of mercury absolute pressure. The 1,4 adduct is separated from the tetrakis adduct by either first reacting the 1,4 adduct with bromine at room temperature to form 1,4-bis-(difluoroamino) 2,3-dibromobutane and subsequently separating these two materials by distillation employing efficient rectification or efficient fractional distillation under 1 to 10 mm. of mercury absolute pressure.

The structure of the tetrakis compound was determined by fluorine analysis and nuclear magnetic resonance measurements (NMR). The theoretical fluorine content of a mixture consisting of 62 wt. percent of the tetrakis compound and 38 wt. percent of the bis adducts (composition determined by gas chromatography) is 54.2% fluorine. It was found by quantitative wide-line NMR that the mixture contained 53.7% fluorine. The ratio of primary to secondary $NF_2$ obtained by high resolution NMR indicated 61% of the tetrakis compound.

High resolution NMR data on these compounds are summarized in the following table:

| | Compounds | Cycles Below Trifluoroacetic Acid at 40 Megacycles | | $J_{HF}$ (cycles) |
|---|---|---|---|---|
| | | Primary $NF_2$ | Secondary $NF_2$ | |
| 1 | 1,4-Bis-(difluoroamino) butene-2 | 5,320 | | 29.4 |
| 2 | 1,2,3,4 Tetrakis-(difluoroamino) butane in perfluorokerosene | 5,290 | 4,780 | 29.8 |
| 3 | 61% Tetrakis | 5,280 | 4,780 | |
| | 39% Bis | 5,200 | | |

For the tetrakis compound the ratio of primary $NF_2$ (5290) to secondary $NF_2$ (4780) was 1.0 which is theoretical for the assigned structure. In addition the proton spectrum of the tetrakis shows that the product contains only hydrogen which is α to $NF_2$.

The novel composition of the present invention may be used as an intermediate in the preparation of nitriles, amines and other nitrogen-containing compounds of known utility. Upon pyrolysis alone or in the presence of boron it forms nitrogen, boron fluoride and hydrogen fluoride, all of which are useful in many ways in the chemical field, e.g., as catalysts. The principal use of this oxidizer is in the rocket propellant systems in which it is admixed with a suitable fuel. The following formulations can be used to prepare suitable rocket propellants:

| Component | Weight Percent | |
|---|---|---|
| | A | B |
| 1,2,3,4 tetrakis-(difluoroamino) butane | 39.26 | 52.42 |
| Tetranitromethane | 44.64 | 34.10 |
| Boron | 2.16 | 2.88 |
| Natural rubber binder | 13.94 | 7.45 |

The calculated specific impulses are 273 sec.[−1] and 288 sec.[−1] for compositions A and B, respectively.

The tetrakis compound may also be mixed with liquid oxygen, e.g., 2 parts oxygen to 1 part of tetrakis compound, to make a suitable liquid propellant which can be used in the conventional manner. It can also be used as a detonating agent or high explosive.

The co-pending application, U.S. Ser. No. 856,615, filed Dec. 1, 1959, by B. Freedman, L. K. Beach and A. E. Messner, and by the common assignee, discloses and claims other difluoroamino compounds which are formed by reacting sufficient tetrafluorohydrazine with a halogen substituted hydrocarbon containing an allyl halide group so that $NF_2$ is substituted for the halogen and $NF_2$ groups saturate the double bond in the allyl group. Such substitution and addition reactions result in a number of products different from products obtained only by addition to 2 double bonds as in the present application.

Having described the invention, what is claimed is:
1,2,3,4 tetrakis-(difluoroamino) butane.

No references cited.

CHARLES B. PARKER, *Primary Examiner.*

L. D. ROSDOL, R. L. CAMPBELL, *Examiners.*

B. R. PADGETT, J. W. WHISLER, *Assistant Examiners.*